United States Patent [19]

Moriyama et al.

[11] Patent Number: 4,529,263
[45] Date of Patent: Jul. 16, 1985

[54] ARRANGEMENT FOR PREVENTING MISCONNECTION BETWEEN OPTICAL CONNECTORS

[75] Inventors: Masakazu Moriyama; Toshio Shinohara, both of Aichi; Kyozo Hayashi; Shigeru Noda, both of Osaka; Fukuma Sakamoto, Osaka, all of Japan

[73] Assignees: Toyota Jidosha Kogyo Kabushiki Kaisha 1, Aishi; Sumitomo Electric Industries, Ltd., Osaka, both of Japan

[21] Appl. No.: 372,957

[22] Filed: Apr. 29, 1982

[30] Foreign Application Priority Data

May 7, 1982 [JP] Japan ................................. 56-67593

[51] Int. Cl.³ .............................................. G02B 5/14
[52] U.S. Cl. ................................. 350/96.20; 350/96.22
[58] Field of Search ........................... 350/96.20, 96.22

[56] References Cited

U.S. PATENT DOCUMENTS 4,160,580 7/1979 Le Noane et al. ............... 350/96.22

Primary Examiner—William L. Sikes
Assistant Examiner—Robert E. Wise
Attorney, Agent, or Firm—Wood, Dalton, Phillips, Mason & Rowe

[57] ABSTRACT

An arrangement is proposed which is adapted to prevent misconnection between two optical connectors each having a female half and a male half. The female half is formed with a projection and the male half is formed with a hole to receive the projection. A guide plate having one corner beveled is mounted on the projection to prevent misconnection.

9 Claims, 6 Drawing Figures

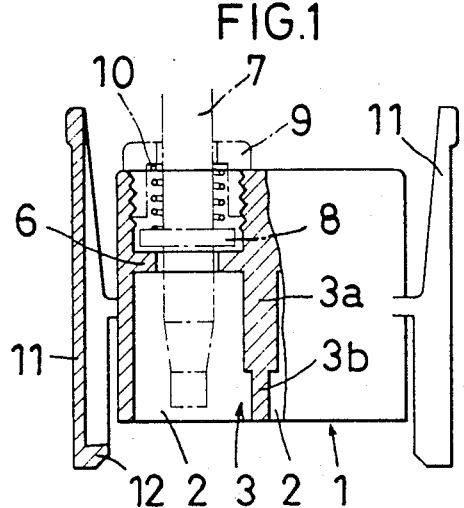
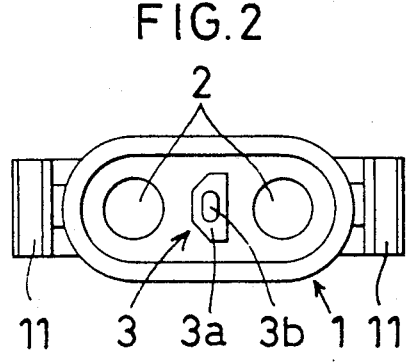
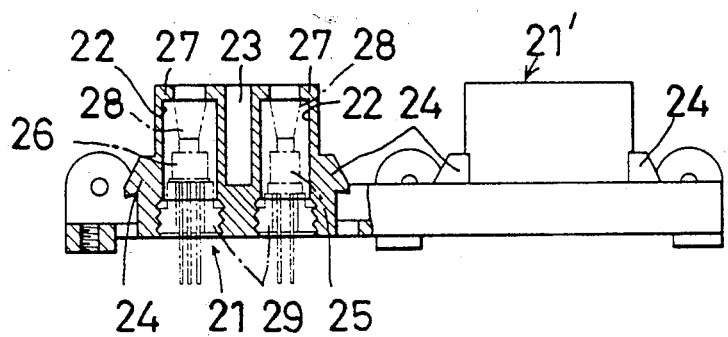
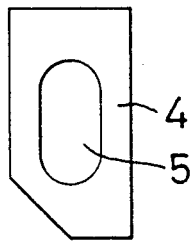
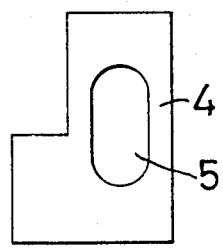
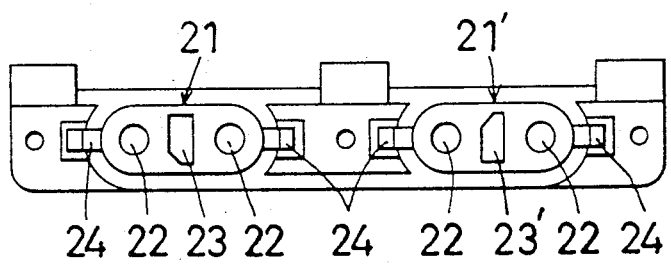

ARRANGEMENT FOR PREVENTING MISCONNECTION BETWEEN OPTICAL CONNECTORS

The present invention relates to an optical connector adapted to prevent misconnection in connecting two pairs of male and female connector halves with each other.

With an optical connector consisting of a male half for supporting a light emitting element and a light receiving element and a female half for supporting the ends of two optical fibers, the male half is formed with a projection on its side wall and the female half is formed with a recess to receive the projection so that they will not be connected in a wrong orientation.

In case two such optical connectors each consisting of a male half and a female half are arranged in proximity to each other, misconnection can occur. For example, the male half of the second connector may be connected with the female half of the first connector by mistake. Such a misconnection will cause the associated devices or instruments to operate abnormally, thus causing trouble. Therefore, such a misconnection must be avoided.

An object of the present invention is to provide an arrangement which can completely prevent such a misconnection between two optical connectors.

Other objects and advantages of the present invention will become apparent from the following description taken with reference to the accompanying drawings, in which:

FIG. 1 is a vertical sectional front view of a female connector half embodying this invention;

FIG. 2 is a bottom view of the same;

FIG. 3 is a vertical sectional front view of a double male half embodying this invention;

FIG. 4 is a plan view of the same;

FIG. 5 is a plan view of an example of a guide plate used in this invention; and FIG. 6 is a plan view of another example of the guide plate.

Referring to FIGS. 1 and 2, a female half 1 of an optical connector has a pair of optical fiber mounts 2 arranged side by side with a projection 3 therebetween. The projection has a base portion 3a and a narrowed tip portion 3b. The base portion has a rectangular cross section having its two corners beveled as shown in FIG. 2. The tip portion 3b has a smaller cross section than that of the base portion 3a. It may have any cross section other than round.

In accordance with the present invention, a separate guide plate 4 as shown in FIG. 5 is provided which has a hole 5 of substantially the same shape as the tip portion 3b of the projection 3 so that it will fit on the tip portion. The cross section of the guide plate is a rectangle having one corner cut off, not two corners as the base portion 3a of the projection. Since the hole in the guide plate 4 is not round, the guide plate cannot be turned when it is fitted onto the tip portion 3by of the projection.

Each optical fiber mount 2 is tubular having a flange 6 on its inner wall and midway of its length to receive a terminal plug 7 attached to the end of an optical fiber. The plug has a flange 8 which is adapted to be axially movable within the range defined by the flange 6 of the mount 2 and a tubular cap 9 screwed into the mount 2. A coil spring 10 is held in position by the cap to urge the plug 7 downwardly. In FIG. 1, only one plug 7 in the mount 2 is shown and the other plug is omitted for simplicity.

The female half 1 is provided with a control plate 11 on each side thereof. The control plate has at its lower end a jaw 12 which is adapted to spread outwardly away from the female half when its upper end is pressed inwardly.

FIGS. 3 and 4 show a double male half having a pair of male halves 21, 21' formed integrally. Since two male halves are substantially the same, only one will be described below.

The male connector half 21 has two element mounts 22 arranged side by side with a hole 23 therebetween. The hole is of substantially the same shape as the guide plate 4 but slightly larger than that so that the guide plate can fit in the hole.

The male half 21 is formed with a shoulder 24 on each side thereof. When the female half 1 of the connector is coupled to the male half 21, the jaws 12 on the control plates 11 of the former engage the shoulders 24 on the latter. In this condition, the element mounts 22 are now held concentrically with respect to the optical fiber mounts 2 with the projection 3 on the female half fitting in the hole 23 in the male half. The lower portion of the optical fiber mounts 2 cover the upper portion of the element mounts 22.

A light emitting element 25 is mounted on one of the element mounts 22 and a light receiving element 26 is mounted on the other. The element mounts 22 are tubular with a flange 27 at their top end. A sleeve 28 is provided in the element mount and pressed against the flange 27 by screwing a hollow bolt 29 from bottom. The sleeve 28 is formed at its upper portion with a tapered bore to receive the plug 7 and at its lower portion with an enlarged hole to receive the light emitting or light receiving element.

The one male connector 21 differs from the other male connector 21' only in the shape of the hole 23 (23'). As shown in FIG. 4, the hole 23 is beveled at bottom left and the hole 23' is done at top left.

The female connector half 1 without the guide plate 4 on the projection 3 can be connected to either of the two male connector halves 23, 23' since the base portion 3a of the projection 3 has its two angles beveled. The female half 1 with the guide plate 4 on the projection 3 with its top side up can be connected to only the male half 21' and the female half 1 with the guide plate with its bottom side up can be connected to only the male half 21. Therefore, there is no fear of misconnection.

If only one pair of the connector halves is to be joined together, no guide plate 4 has to be attached to the female half 1 because there is no possibility of misconnection. If two pairs of the connector halves are used close to each other, the guide plate 4 is secured beforehand to the projection 3 on each of the female halves 1 with an adhesive or by welding, with its top side up to one of the female halves and with its bottom side up to the other. These female halves 1 with the guide plates are connected to the double male connector half as shown in FIG. 4. This arrangement can eliminate the possibility of misconnection completely.

The shapes of the projection 3, the guide plate 4 and the holes 23, 23' are not limited to those shown in the preferred embodiment. The only requirement for the guide plate 4 is that it is asymmetric both with respect to its vertical and horizontal axes and that it can be secured onto the projection 3 on the female half with its top side up or down. One of the holes 23, 23' has only to be of such a shape as to receive the guide plate as it is and the other has to be of such a shape as to receive the guide plate turned upside down.

FIG. 6 shows another example of the guide plate 4 having a different shape from that of FIG. 5.

Although in the preferred embodiment the projection 3 and the hole 23 (23') are located between the mounts 2, 2 (or 22, 22), they may be provided at any other position.

It will be understood from the foregoing that the arrangement according to the present invention can prevent misconnection between two connectors used close to each other because the female halves 1 can be connected only to the correct male halves 21 (21'). This eliminates troubles due to misconnection and assures safe operation of the associated devices.

Although in the preferred embodiment the female half is formed with a projection and the male half is formed with a hole to receive the projection, the male half may be formed with a projection and the female half may be formed with a hole to receive it.

Although in the preferred embodiment a double male half having two male halves formed integrally as used, two male halves may be used instead so long as their holes are in such a relative position as shown in FIG. 4.

What we claim is:

1. Apparatus for preventing misconnection between optical connector pairs, each connector pair comprising a male connector half and a female connector half, said apparatus comprising:
   a projection on either of the male or female connector halves of each connector pair, said projection having a preselected cross-sectional shape that is symmetrical about at least one axis;
   a cavity in the other of the male or female connector halves of each connector pair, said cavity having a cross-sectional shape that will accept the insertion of the projection in the cavity in at least two predetermined orientations and prevent its rotation while inserted; and
   a guide plate selectively fixedly secured selectively right-side-up or upside-down to the projection, the guide plate having a shape that is substantially the same as the cavity's cross-sectional shape.

2. The apparatus as claimed in claim 1 wherein said female half is provided with said projection and said male half is provided with said hole.

3. The apparatus as claimed in claim 1 wherein two male halves are arranged side by side integrally with each other to form a double male half, said holes in these two male halves having the same shape but being in different orientation, thereby preventing misconnection.

4. The apparatus as claimed in claim 1 wherein said projection, cavity, and guide plate define first alignment means one one of said female half and said male half of one of said optical connectors defining a first projection having a preselected cross-sectional periphery, a first guide plate removably mounted on said projection selectively in either of two different alignments and having an asymmetrical periphery differing partially from that of the projection; second alignment means on the other of said female half and said male half of said one optical connector having a first hole having substantially the same peripheral shape as said guide plate so that said hole fits said guide plate in only a single alignment but fits said projection in each of two different alignments, third alignment means on one of said female half and said male half of the other of said optical connectors defining a second projection having said preselected cross-sectional periphery, a second guide plate similar to said first guide plate removably mounted on said second projection in an alignment opposite to the alignment of the first guide plate on said first projection, and fourth alignment means on the other of said female half and said male half of said other optical connector defining a second hole having substantially the same peripheral shape as said second quide plate so that said second hole fits said second guide plate in only a single alignment and fits said second projection in each of two different alignments, whereby said connector halves may be interconnected with either optical fiber mount of one half aligned with the respective optical fiber mounts of the other half in the absence of said guide plate being mounted on said projection and the optical fiber mounts of said one half being alignable in a single preselected alignment with the optical fiber mounts of the other half when said guide plate is mounted on said projection.

5. The apparatus of claim 1 wherein said projection is symmetrical about a first axis and asymmetrical about a second axis transverse to said first axis.

6. Apparatus for preventing misconnection between an optical connector pair comprising a male optical connector half and a female optical connector half, said apparatus comprising:
   a projection on either of the male or female optical connector half of said optical connector pair, said projection having a preselected cross-sectional shape that is symmetrical about at least one axis;
   a cavity in the other of the male or female optical connector half of said optical connector pair, said cavity having a cross-sectional shape that will accept the insertion of the projection in the cavity in at least two predetermined orientations and prevent its rotation while inserted; and
   a separate guide plate selectively fixedly secured selectively to the projection in either of two directly opposite dispositions, the guide plate having a shape that is substantially the same as the cavity's cross-sectional shape.

7. The apparatus of claim 6 wherein said female half is provided with said projection and said male half is provided with said hole.

8. The apparatus of claim 6 wherein two male halves are arranged side by side integrally with each other to form a double male half, said holes in these two male halves having the same shape but being in a different orientation, thereby preventing misconnection.

9. The apparatus of claim 6 wherein said projection is symmetrical about a first axis and asymmetrical about a second axis transverse to said first axis.

* * * * *